United States Patent [19]

Kopf

[11] Patent Number: 4,530,712
[45] Date of Patent: Jul. 23, 1985

[54] PIPETTE PULLER

[76] Inventor: J. David Kopf, 7324 Elmo St., Tujunga, Calif. 91042

[21] Appl. No.: 593,261

[22] Filed: Mar. 26, 1984

[51] Int. Cl.³ .............................................. C03B 23/11
[52] U.S. Cl. ...................................... 65/270; 65/108; 65/110; 65/285
[58] Field of Search .................. 65/108, 110, 270, 285

[56] References Cited

U.S. PATENT DOCUMENTS

| | | | |
|---|---|---|---|
| 2,265,359 | 12/1941 | Neumann | 65/270 X |
| 3,424,838 | 1/1969 | Buus | 65/108 |
| 3,489,544 | 1/1970 | Andrews et al. | 65/162 |
| 3,556,758 | 1/1971 | Andrews et al. | 65/280 |
| 3,556,760 | 1/1971 | Bender et al. | 65/283 |
| 3,652,248 | 3/1972 | Loxley et al. | 65/108 |
| 3,852,054 | 12/1974 | Dichter | 65/109 |
| 3,985,535 | 10/1976 | Bennett et al. | 65/108 |
| 4,111,677 | 4/1978 | Andrews | 65/271 |
| 4,121,920 | 10/1978 | Balkwill | 65/13 |

OTHER PUBLICATIONS

Physical Techniques in Biological Research, vol. 5, pp. 36-59, by William Nastuck, (1967).
Kopf Model 700D Pipette Puller, (1983).

Primary Examiner—Arthur Kellogg
Attorney, Agent, or Firm—Bruce H. Johnsonbaugh

[57] ABSTRACT

A pipette puller is provided for drawing glass or quartz tubing into micropipettes. A fixed clamp and movable clamp are utilized and between the clamps a furnace is provided which has an opposing pair of elongated heating elements. The heating elements are supported by binding posts of high thermal conductivity and relatively large mass, which provides relatively low thermal inertia of the heating elements. The heating elements may be moved relative to each other, facilitating a high degree of control of the temperature applied to the glass or quartz tubing for obtaining uniformly repeatable shapes of micropipettes 20 Claims, 11 Drawing Figures

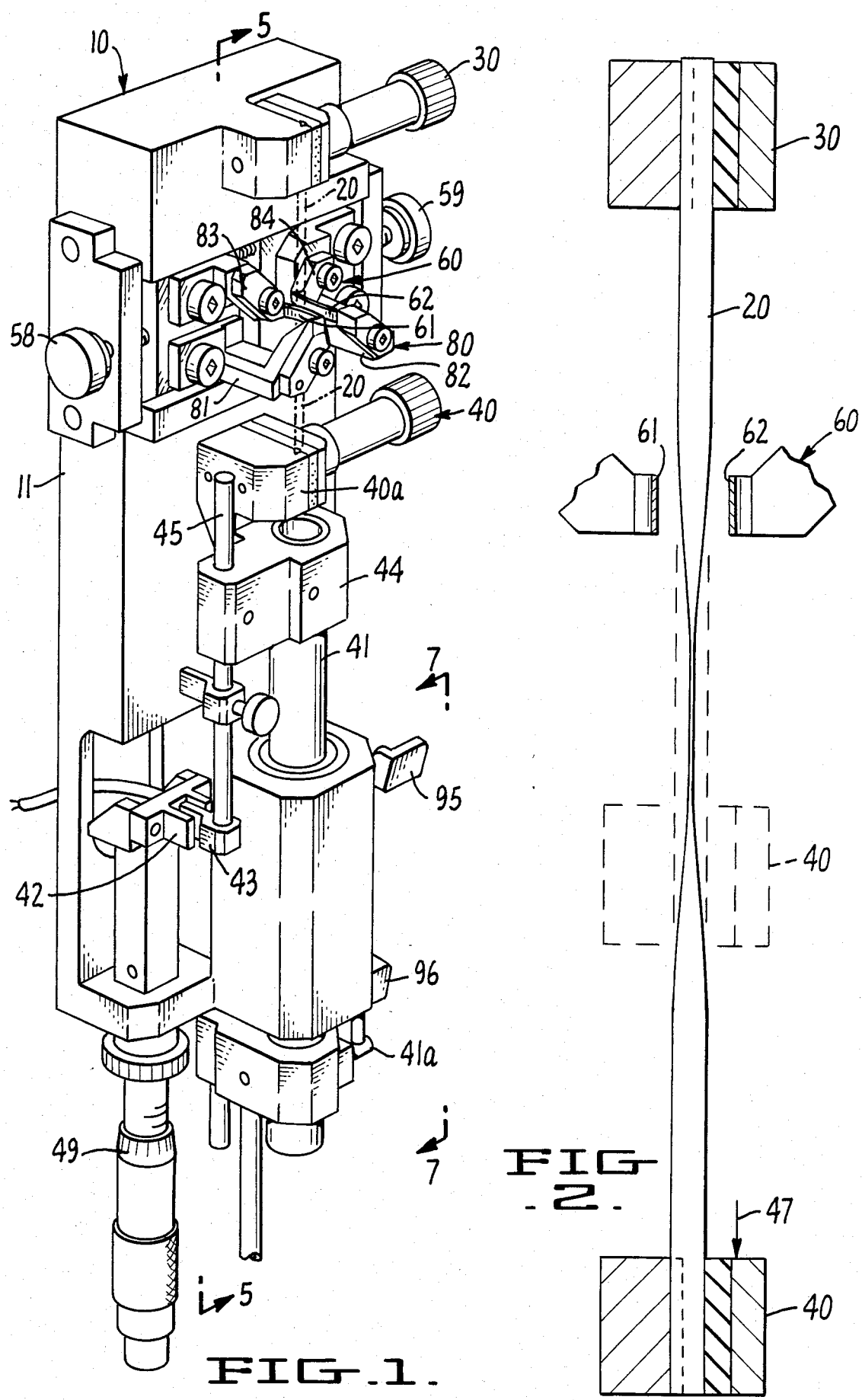

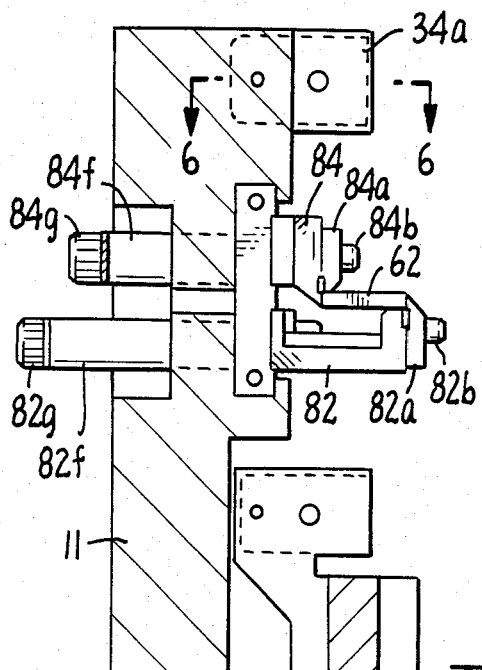
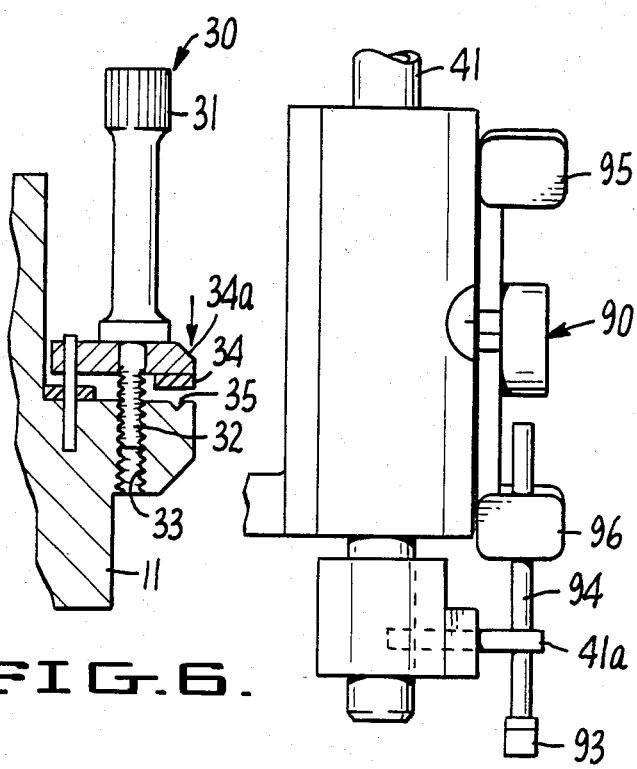
FIG.6.
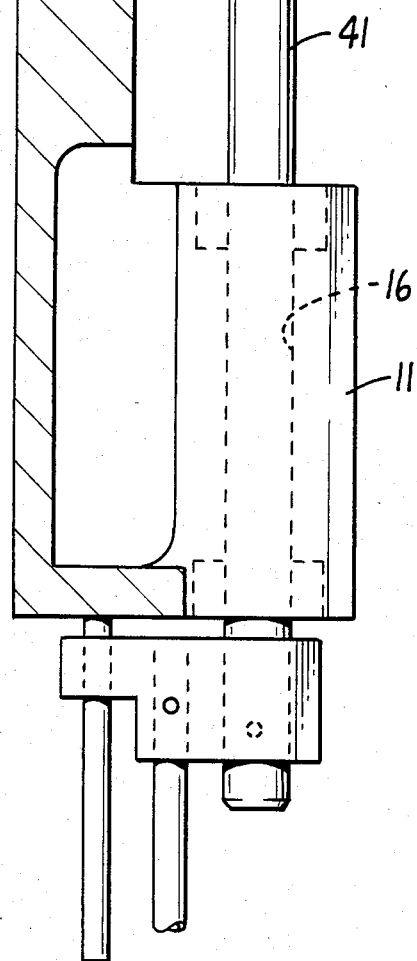
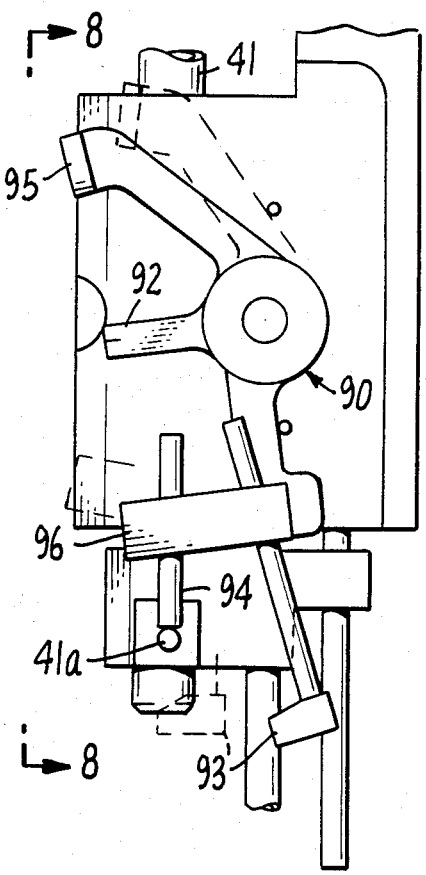
FIG.5.  FIG.7.
FIG.8.

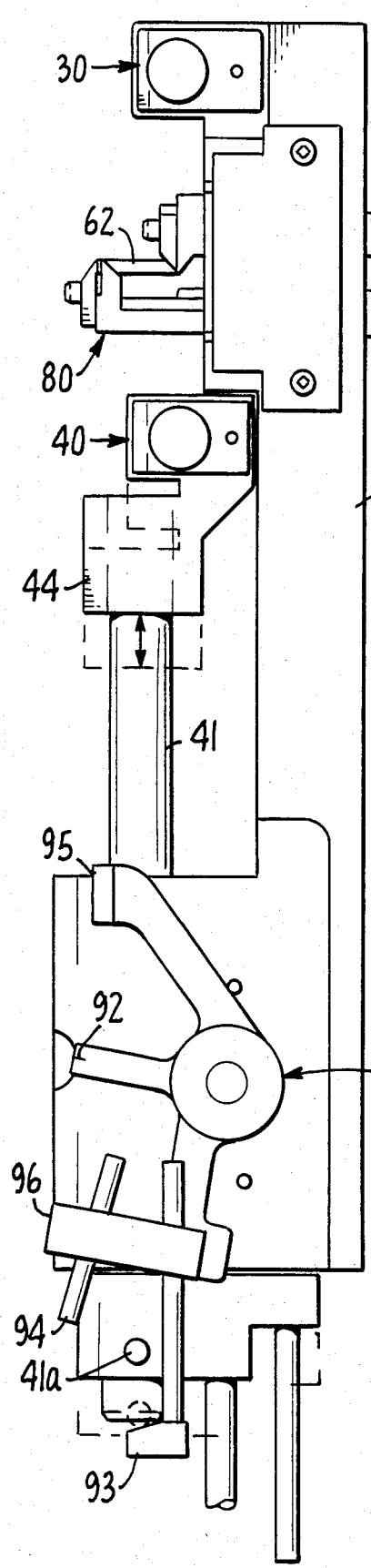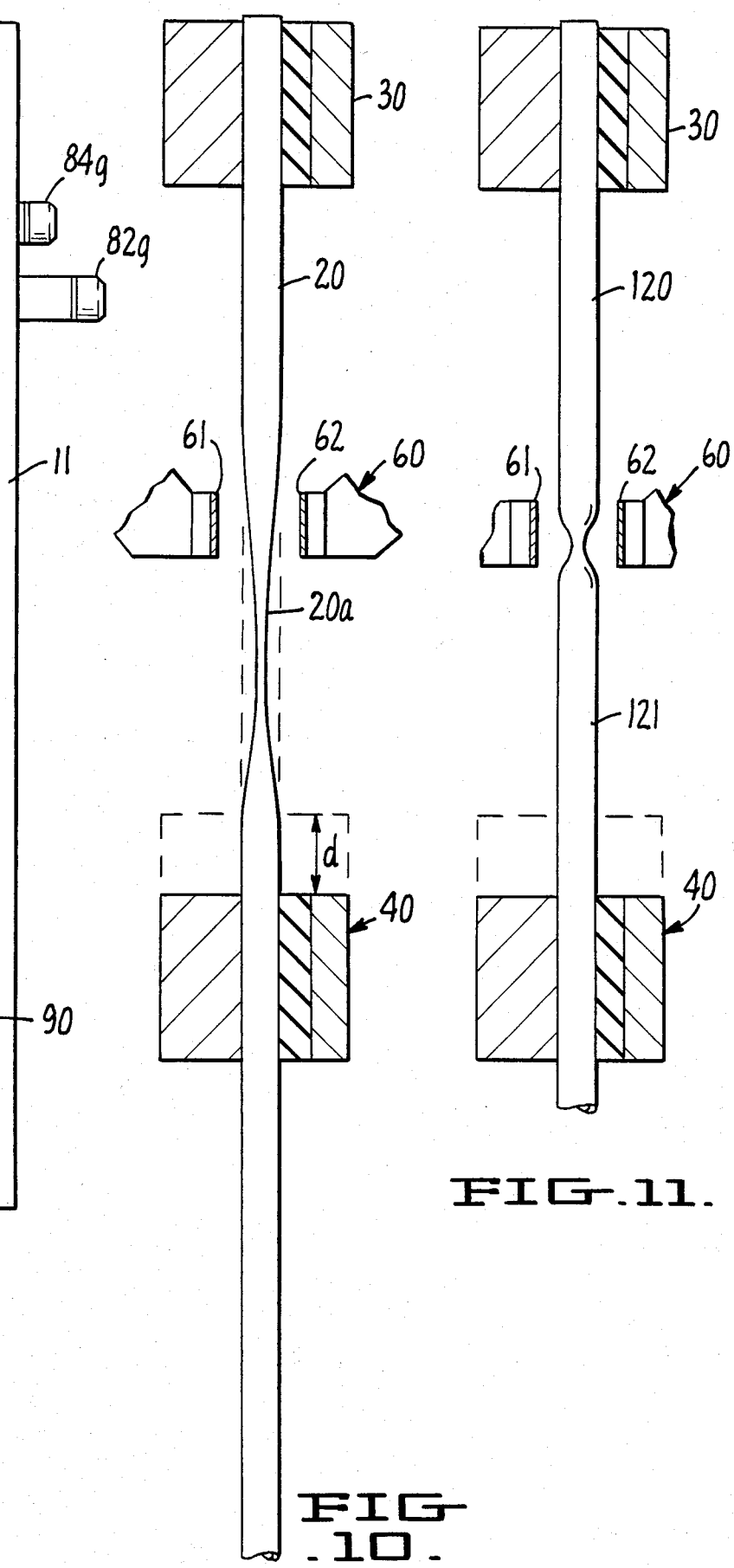
FIG. 9.    FIG. 10.    FIG. 11.

PIPETTE PULLER

BACKGROUND OF THE INVENTION

This invention is in the field of drawing glass or quartz tubing into micropipettes which may be utilized as microelectrodes, needles or the like.

The prior art teaches a variety of pipette pullers and glass drawing instruments. A book entitled "Physical Techniques in Biological Research, Vol. 5," published in 1967 and edited by William Nastuck, describes a variety of prior art devices for pulling glass pipettes for use as microelectrodes. The heating elements described are generally platinum coils, tubular heaters or elements which subtend an angle around the heating zone of more than 270°. U.S. Pat. No. 4,111,677 dated Sept. 5, 1978 shows a device utilizing dual furnaces in which each furnace utilizes coil heaters. Generally speaking, the heating elements of the prior art have relatively high thermal inertia, relatively poor temperature control of heating elements and are not capable of adjusting the relative positions of the glass tube and the heating elements.

SUMMARY OF THE INVENTION

The present invention provides a pipette puller with heating elements having an extremely low thermal inertia. This is accomplished by the use of an opposing pair of heating elements which may be moved relative to each other and which are supported by highly thermal conductive binding posts having much greater mass than the heating elements.

A primary object of the invention is to provide a pipette puller which is capable of extremely fine temperature controls of the heating elements facilitating a high level of repeatability.

A further object of the invention is to provide a pipette puller capable of repeatably drawing quartz tubing.

Another object of the invention is to provide a pipette puller in which the heating elements may be adjusted relative to each other and relative to the workpiece.

Another object of the invention is to provide a pipette puller in which the workpiece may be readily inserted into and removed from the mechanism.

BRIEF DESCRIPTION OF THE DRAWINGS

Other objects, features and advantages of the invention will be readily apparent from the following description taken in conjunction with the accompanying drawings in which:

FIG. 1 is a perspective view of the pipette puller;

FIG. 2 is a schematic representation of the process of drawing a piece of tubing;

FIG. 5 is a cross-sectional view taken along the line 5—5 of FIG. 1;

FIG. 6 is a cross-sectional view taken along the line 6—6 of FIG. 5;

FIG. 7 is a elevational view along the line 7—7 of FIG. 1;

FIG. 8 is an elevational view along the line 8—8 of FIG. 7;

FIG. 9 is an elevational view of the apparatus;

FIG. 10 is a schematic representation of a portion of the patch clamp drawing process; and FIG. 11 is a schematic representation of another pipette design that can be produced with the apparatus.

DESCRIPTION OF THE PREFERRED EMBODIMENTS

Figure 4:
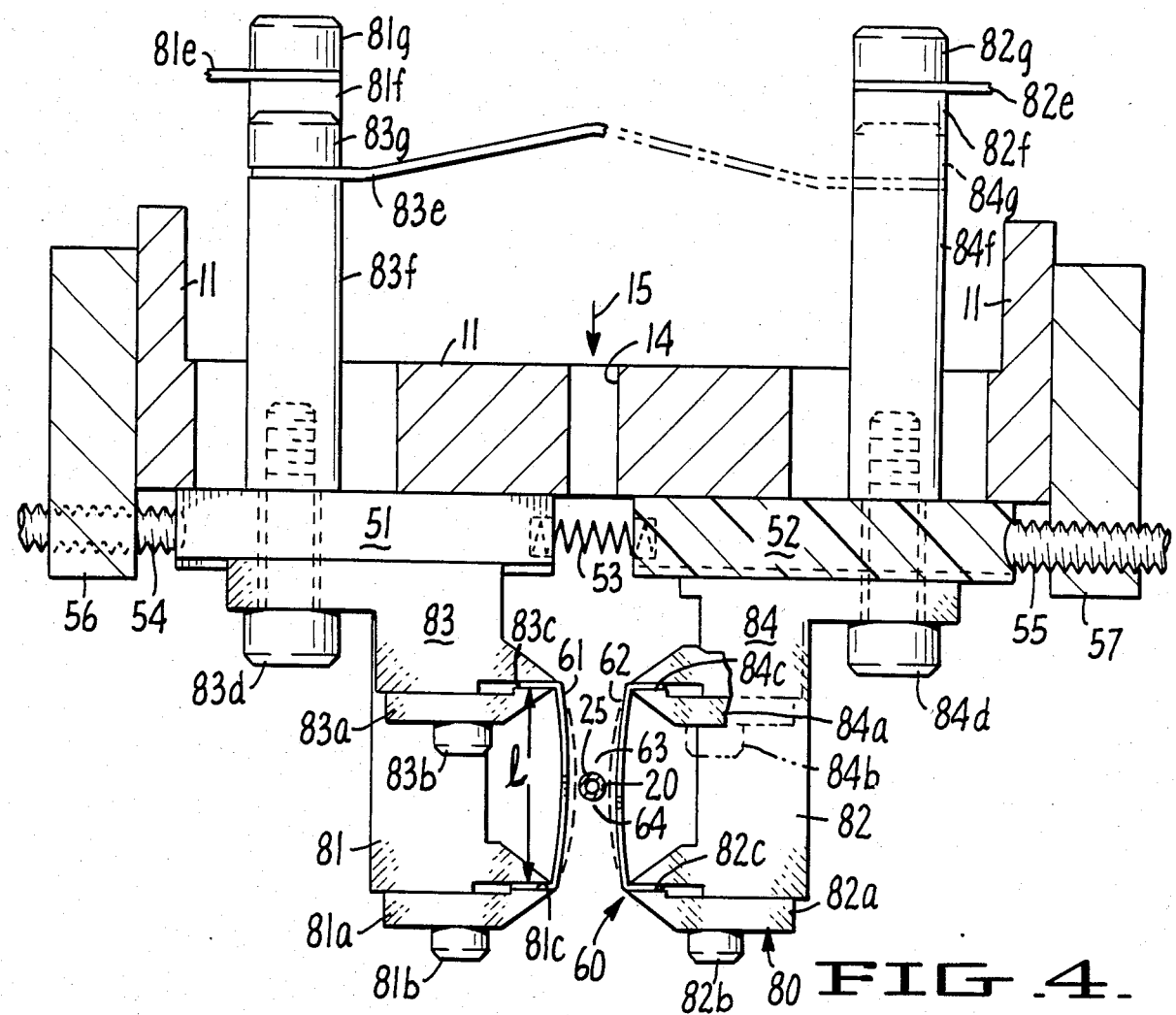
FIG. 4 is a cross-sectional view taken substantially along the line 4—4 of FIG. 3.

FIG. 1 shows the pipette puller shown generally as 10 for drawing glass or quartz tubing 20 into micropipettes, microelectrodes or microneedles in which the tip will be open and typically less than one micron in outer diameter. Two micropipettes are formed from tube 20 (FIG. 2). As used herein the term "micropipette" includes microelectrodes and microneedles with tips of ten microns or less outer diameter.

Fixed clamp 30 holds the upper end of tubing 20 during the drawing process. Movable second clamp means 40 grasps the lower section of tubing 20 and moves in a downwardly direction as shown by arrow 47 of FIG. 2 when the drawing temperature has been attained. Furnace means shown generally as 60 heats the tubing to a precise temperature at a precisely controlled rate to increase the repeatability of the drawing process. As shown best in FIG. 4, furnace means 60 comprises an opposing pair of elongated heating elements 61 and 62 which define a heating zone 25 between the central portions of elements 61 and 62. Binding post means referred to generally as 80 comprise four posts 81, 82, 83 and 84 which utilize clips 81a, 82a, 83a and 84 a anchored by set screws 81b, 82b, 83b and 84b to support the ends of heating elements 61 and 62.

Heating elements 61 and 62 are rectangular in cross section and in the embodiment shown are one-half in length "l," 0.002 inches in thickness and 0.060 inches in height. The height of the heating elements exceeds the thickness by at least a factor of 10 to avoid unnecessary sagging at higher temperatures. The material used in heating elements 61 and 62 is platinum with 10% iridium. As shown best in FIG. 4, the surface of each heating element 61 and 62 forms a convex surface relative to heating zone 25. As shown in phantom, as heating elements 61 and 62 are heated, they expand in a direction toward tubing 20. As heating elements 61 and 62 cool, they contract and increase the clearance around tubing 20, thereby facilitating removal of tubing 20 and loading a new section of tubing. Although it is possible to bend either or both heating elements 61 and/or 62 so that the element forms a concave surface relative to heating zone 25, those orientations are not as desirable as that shown in FIG. 4. I have found that using the orientation of heating elements 61 and 62 as shown in FIG. 4 attains a rather uniform temperature distribution in heating zone 25 which as shown in FIG. 4 surrounds tubing 20. I believe the uniform temperature distribution around tubing 20 is facilitated in part by radiant heat reflecting off elements 61 and 62 and heating the regions 63 and 64 so that relatively uniform temperatures are attained around the entire circumference of tube 20.

Binding posts 81-84 have rectangular recesses 81c, 82c, 83c and 84c which receive and surround the ends of heating elements 61 and 62 in order to maximize thermal conductivity between the heating elements and the binding posts.

The mass of the binding posts exceeds the mass of the heating elements by roughly a factor of 250, in order to rapidly dissipate any excess heat in elements 61,62 and to provide a relatively low thermal inertia of heating elements 61 and 62. I have found that the relative mass of the binding posts to the heating elements should be at least 50 to 1.

Slidably mounted support means are shown generally as 50 in FIG. 1 which carry binding post means 80. As shown best in FIGS. 3 and 4, slidably mounted support 51 carries binding posts 81 and 83 as well as heating element 61. Similarly, support 52 carries binding posts 82 and 84 as well as heating element 62. Springs 53 urge supports 51 and 52 apart while threaded screws 54 and 55 extend through ears 56 and 57 which are respectively anchored to frame 11 of pipette puller 10. Thumb screws 58 and 59 shown in FIG. 1 are provided to adjust supports 51 and 52 as well as heating elements 61 and 62 relative to heating zone 25 and to adjust heating elements 61 and 62 relative to each other. Heating elements 61 and 62 may be adjusted at operating temperatures.

Figure 3:
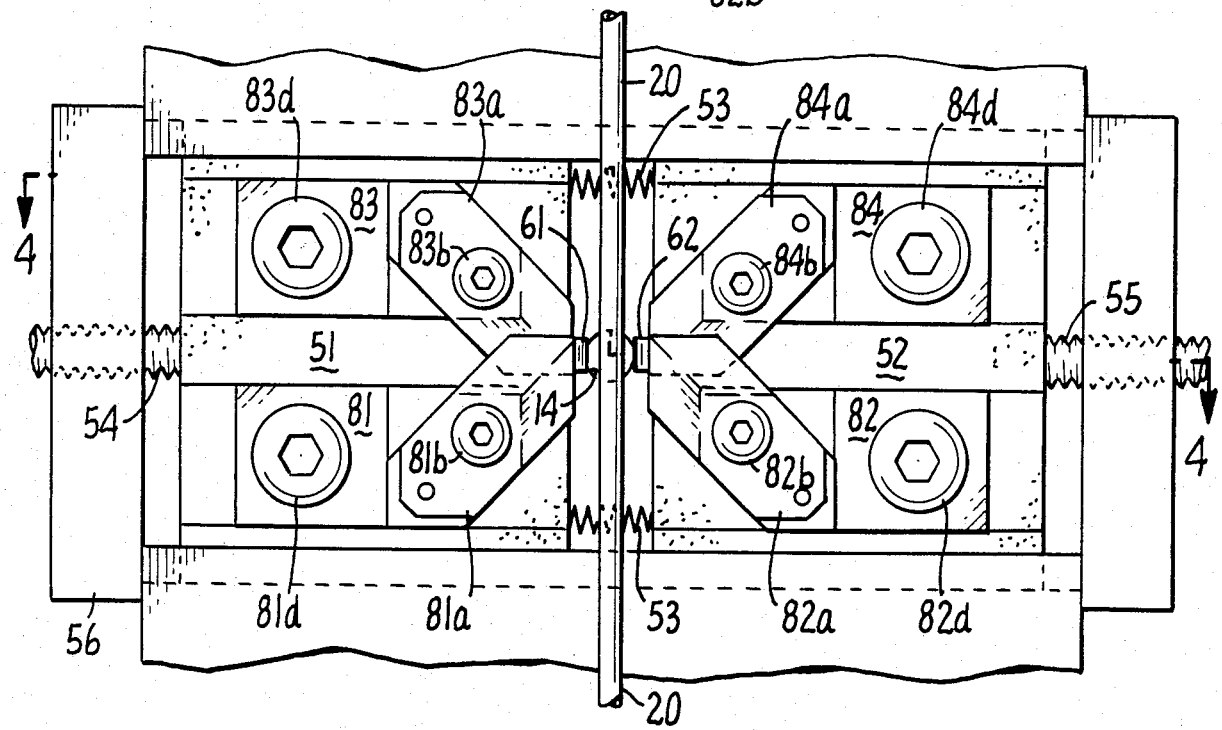
FIG. 3 is an elevational view of a portion of the mechanism shown in FIG. 1.

Bolt 81$d$ threads into sleeve 81$f$ and connects binding post 81 to support 51 and bolt 83$d$ threads into sleeve 83$f$ and connects binding post 83 to support 51 as shown in FIG. 3. Similarly bolts 82$d$ and 84$d$ thread into sleeves 82$f$ and 84$f$ and connect binding posts 82 and 84 to support 52. Sleeves 81$f$ and 82$f$ have a heating voltage applied across them by leads 81$e$ and 82$e$ secured by screws 81$g$ and 82$g$. Sleeves 83$f$ and 84$f$ are connected electrically by connection 83$e$ secured by screws 83$g$ and 84$g$. Supports 51 and 52 are electrical insulators.

Passageway 14 formed in frame 11 extends in the direction of heating zone 25 so that cooling air may be introduced in the direction of arrow 15 in the event air is needed to reduce the temperature in heating zone 25. The airflow approaches heating zone 25 along a path extending between heating elements 61, 62.

Referring to FIG. 1, movable clamp means 40 comprises a cylindrical slide 41 which is carried in passageway 16 formed in frame 11 (FIG. 5). Optical switch 42 is activated by flag 43 which is carried by slide 41 through connector 44 and shaft 45. As the drawing temperature of the tubing is reached, the dead weight of movable clamp means 40 applies a gentle downward force and flag 43 moves downwardly relative to optical switch 42 which immediately shuts off the power to heating elements 61 and 62. The downward motion of slide 41 may be driven by a solenoid or other means to accomplish a predetermined rate and amount of downward force which produces a variety of shapes of the tubing.

The position of optical switch 42 is controlled by micrometer thumb wheel 49.

It is often advantageous to draw the tubing in multiple stages, referred to herein as the patch clamp mode. In the patch clamp mode, it is important that the initial pull be consistent and repeatable so that multiple micropipettes can be formed with the most uniform characteristics of shank tip and lumen characteristics. Patch clamp means 90 shown best in FIG. 7 is provided for this purpose. Patch clamp means 90 includes arms 95,96, indicator arm 92, and stops 93 and 94. First stop 93 as shown in FIG. 7 is in its retracted position. As shown in phantom in FIG. 7, stop 93 is in position to limit the downward travel of slide 41. A second stop 94 is provided which in the position shown in FIG. 7 restricts the upward motion of slide 41 by impringing upon pin 41$a$ which is rigidly attached to slide 41 as shown in FIG. 1. To operate the device in the patch clamp mode, patch clamp means 90 is first put into its position as shown in FIG. 9 and in phantom in FIG. 7. Tubing 20 is heated and drawn distance "d" as shown in FIG. 10, at which point stop 93 limits the downward travel of slide 41. Tubing 20 is drawn into a shape as generally shown in FIG. 10. Patch clamp means 90 is then moved into the position shown in FIG. 7, the fixed clamp 30 is opened and slide 41 is moved upwardly until pin 41$a$ hits patch clamp stop 94. Upper clamp 30 is tightened and heating elements 61 and 62 are now adjacent the narrow portion 20$a$ of tubing 20. Patch clamp means 90 is then moved to a neutral position between the two positions shown in FIG. 7 and the second pull is made. Upper arm 95 and lower arm 96 of patch clamp means 90 serve an indicating function of the position of patch clamp means 90 and provide an easy means of moving patch clamp means 90 to any of its three positions in each of which it is maintained by a spring detent.

FIG. 11 shows how the use of alternate temperatures and drawing force will produce two micropipettes 120,121 (shown prior to separation) of relatively shorter length of tip.

FIG. 6 shows the construction of clamp 30. A similar construction is used for movable clamp 40$a$. Knob 31 drives threaded screw 32 into a threaded passageway 33 in frame 11. A resilient and heat resistant pad 34 moves with respect to a V-shaped seat 35 formed in frame 11. Tubing 20 is held between seat 35 and pad 34 and may be readily removed from the clamp 30 as resilient pad 34 is moved outwardly from seat 35. When clamps 30 and 40$a$ are open, tube 20 can be readily inserted into or removed from the puller 10.

In operation, I have been able to draw quartz tubing as well as borosilicate glass and to obtain repeatable results with open tips substantially less than one micron outer diameter. I believe that this invention is the first mechanism capable of repeatably drawing quartz tubing. The use of heating elements 61 and 62 of relatively low thermal inertia and both being movable relative to tubing 20 facilitates extremely delicate regulation of the temperature applied to the tubing 20.

I claim:

1. A pipette puller for drawing glass or quartz tubing into micropipettes comprising:
   a first clamp,
   a movable clamp means,
   furnace means positioned between said clamps, said furnace means comprising an opposing pair of elongated, electrical resistance heating elements substantially transversely of said tube, a heating zone defined between said elongated portions of said heating elements such that said tubing is heated by radiation and convection,
   whereby when the drawing temperature of said tubing is reached in said heating zone, said movable clamp means draws one end of said tubing relative to the other end in a predetermined manner to produce a tapered and hollow micropipette having a tip diameter of less than ten microns.

2. The apparatus of claim 1 wherein each of said heating elements forms a convex surface relative to said heating zone.

3. The apparatus of claim 2 wherein said heating elements are curved about an axis which is parallel to the axis of the tubing being drawn in order to concentrate the heating zone.

4. The apparatus of claim 2 wherein said heating elements are rectangular in cross-section and the height exceeds the thickness by a factor of at least ten.

5. The apparatus of claim 1 further comprising air injector means for inroducing airflow into said heating zone along a path extending between said heating elements.

6. The apparatus of claim 1 wherein said movable clamp means comprises a slide which carries said movable clamp means and patching clamp means for limiting the motion of said movable clamp means.

7. The apparatus of claim 1 further comprising binding post means with high thermal conductivity which support the ends of said heating elements.

8. The apparatus of claim 7 further comprising:
slidably mounted support means which carry said binding post means whereby either of said heating elements can be moved relative to the other.

9. The apparatus of claim 8 wherein said heating elements are adjustable at operating temperatures.

10. The apparatus of claim 7 wherein the mass of said binding post means exceeds the mass of said heating elements by at least a factor of fifty so that the thermal inertia of said heating element is low.

11. The apparatus of claim 7 wherein each of said binding post means has a rectangular recess which receives and surrounds one end of said heating element.

12. A pipette puller for drawing glass or quartz tubing into tapered micropipettes comprising:
a first clamp;
a movable second clamp;
furnace means positioned between said clamps for defining a heating zone about said tubing;
elongated electrical resistance heating means in said heating zone substantially transversely of said tubing for heating said tubing by radiation and convection so that substantially uniform temperatures can be obtained around the circumference of said tubing;
whereby when the drawing temperature of said tubing is reached in said heating zone, said movable second clamp can draw one end of said tubing relative to the other end to produce a tapered and hollow micropipette having a tip diameter of less than ten microns.

13. The apparatus of claim 12 wherein said heating elements are rectangular in cross-section and the height exceeds the thickness by a factor of at least ten.

14. The apparatus of claim 13 wherein each of said heating elements forms a convex surface relative to said heating zone.

15. The apparatus of claim 14 wherein said heating elements are curved about an axis which is parallel to the axis of the tubing being drawn in order to concentrate the heating zone.

16. The apparatus of claim 13 wherein said heating elements are adjustable at operating temperatures.

17. The apparatus of claim 16 further comprising:
slidably mounted support means which carry said binding post means whereby either of said heating elements can be moved relative to the other.

18. The apparatus of claim 17 wherein the mass of said binding post means exceeds the mass of said heating elements by at least a factor of fifty so that the thermal inertia of said heating elements is low.

19. The apparatus of claim 18 wherein each of said binding post means has a rectangular recess which receives and surrounds one end of said heating element.

20. The apparatus of claim 19 wherein said movable second clamp comprises a slide which carries said movable second clamp and patching clamp means for limiting the motion of said movable second clamp.

* * * * *